US007669222B2

(12) United States Patent  (10) Patent No.: US 7,669,222 B2
McEnroe et al.  (45) Date of Patent: Feb. 23, 2010

(54) VIRTUAL TUNER MANAGEMENT

(75) Inventors: Elizabeth Rose McEnroe, Palo Alto, CA (US); Mark Wagner, Seattle, WA (US); Peter J. Potrebic, Calistoga, CA (US); Thomas H. Taylor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 11/275,577

(22) Filed: Jan. 17, 2006

(65) Prior Publication Data

US 2007/0174287 A1 Jul. 26, 2007

(51) Int. Cl.
   *H04N 7/173* (2006.01)
   *H04N 7/16* (2006.01)
   *H04N 7/18* (2006.01)
   *G06F 15/16* (2006.01)

(52) U.S. Cl. .................... 725/110; 725/80; 725/132; 725/140; 725/152; 709/217

(58) Field of Classification Search .................. 725/78, 725/80, 82, 109, 110, 114, 138, 144, 132, 725/140, 152; 709/217–219
   See application file for complete search history.

(56) References Cited

U.S. PATENT DOCUMENTS

| 5,583,995 | A | 12/1996 | Gardner et al. |
| 5,854,887 | A * | 12/1998 | Kindell et al. ................ 725/86 |
| 5,901,148 | A | 5/1999 | Bowen et al. |
| 5,940,738 | A | 8/1999 | Rao |
| 6,125,396 | A | 9/2000 | Lowe |
| 6,133,910 | A | 10/2000 | Stinebruner |
| 6,466,978 | B1 | 10/2002 | Mukherjee et al. |
| 6,510,556 | B1 | 1/2003 | Kusaba et al. |
| 6,538,656 | B1 | 3/2003 | Cheung et al. |
| 6,795,707 | B2 | 9/2004 | Martin et al. |
| 6,839,070 | B2 | 1/2005 | Meandzija et al. |
| 6,965,770 | B2 | 11/2005 | Walsh et al. |
| 6,973,038 | B1 | 12/2005 | Narendran |
| 7,068,674 | B1 | 6/2006 | Jang et al. |
| 7,257,132 | B1 | 8/2007 | Akamatsu et al. |
| 7,337,233 | B2 | 2/2008 | Dillon |
| 7,366,199 | B1 | 4/2008 | Vaughan et al. |
| 7,380,264 | B2 * | 5/2008 | Potrebic ...................... 725/74 |
| 2001/0034649 | A1 | 10/2001 | Acres |
| 2001/0049715 | A1 | 12/2001 | Kidder |
| 2002/0083187 | A1 | 6/2002 | Sim et al. |
| 2002/0087696 | A1 | 7/2002 | Byrnes |

(Continued)

FOREIGN PATENT DOCUMENTS

KR   20050015528 A   2/2005

(Continued)

*Primary Examiner*—Joseph G Ustaris
(74) *Attorney, Agent, or Firm*—Lee & Hayes, PLLC (57) ABSTRACT

Embodiments of virtual tuner management are described. A viewing system, for instance, may include a plurality of client devices that are configured to render content, such as television programs. The viewing system may pool the resources available from the client devices such that each client device is not limited to functionality that is provided locally by the client device. To manage content consumption in the viewing system, virtual tuners may be employed, each of which represent an ability of the viewing system to consume a single stream of content (e.g., a television program) provided by a content provider.

19 Claims, 6 Drawing Sheets

U.S. PATENT DOCUMENTS

| | | |
|---|---|---|
| 2002/0097750 A1 | 7/2002 | Gunaseelan et al. |
| 2002/0112247 A1 | 8/2002 | Horner et al. |
| 2002/0126698 A1 | 9/2002 | Deshpande |
| 2002/0133537 A1 | 9/2002 | Lau et al. |
| 2002/0133589 A1 | 9/2002 | Gubbi et al. |
| 2003/0009452 A1 | 1/2003 | O'Rourke et al. |
| 2003/0041164 A1 | 2/2003 | Denecheau et al. |
| 2003/0048801 A1 | 3/2003 | Sala et al. |
| 2003/0050058 A1 | 3/2003 | Walsh et al. |
| 2003/0069964 A1 | 4/2003 | Shteyn et al. |
| 2003/0086413 A1 | 5/2003 | Tartarelli et al. |
| 2003/0093548 A1 | 5/2003 | Cinghita et al. |
| 2003/0115294 A1 | 6/2003 | Hoang |
| 2003/0158890 A1 | 8/2003 | Miller et al. |
| 2003/0177179 A1 | 9/2003 | Jones et al. |
| 2003/0195977 A1 | 10/2003 | Liu et al. |
| 2003/0204848 A1* | 10/2003 | Cheng et al. .......... 725/58 |
| 2003/0204853 A1* | 10/2003 | Fries et al. ............ 725/93 |
| 2003/0233540 A1 | 12/2003 | Banerjee et al. |
| 2004/0039834 A1 | 2/2004 | Saunders et al. |
| 2004/0125779 A1 | 7/2004 | Kelton et al. |
| 2004/0163130 A1* | 8/2004 | Gray et al. ........... 725/132 |
| 2004/0187152 A1* | 9/2004 | Francis et al. ......... 725/58 |
| 2004/0255323 A1 | 12/2004 | Varadarajan et al. |
| 2005/0005300 A1* | 1/2005 | Putterman et al. ...... 725/89 |
| 2005/0041595 A1 | 2/2005 | Uzun et al. |
| 2005/0076127 A1 | 4/2005 | Wilson et al. |
| 2005/0102698 A1* | 5/2005 | Bumgardner et al. ...... 725/80 |
| 2005/0120102 A1 | 6/2005 | Gandhi et al. |
| 2005/0138621 A1 | 6/2005 | Clark et al. |
| 2005/0138663 A1 | 6/2005 | Throckmorton et al. |
| 2005/0138668 A1* | 6/2005 | Gray et al. ........... 725/110 |
| 2005/0172315 A1 | 8/2005 | Chen |
| 2005/0188415 A1 | 8/2005 | Riley |
| 2005/0198097 A1 | 9/2005 | Kalnitsky |
| 2005/0198662 A1 | 9/2005 | Endo et al. |
| 2005/0213503 A1 | 9/2005 | Guo et al. |
| 2005/0223232 A1 | 10/2005 | Anderson et al. |
| 2005/0251566 A1 | 11/2005 | Weel |
| 2005/0289618 A1 | 12/2005 | Hardin |
| 2006/0010003 A1 | 1/2006 | Kruse |
| 2006/0020960 A1 | 1/2006 | Relan et al. |
| 2006/0031887 A1 | 2/2006 | Sparrell et al. |
| 2006/0053452 A1 | 3/2006 | Lee et al. |
| 2006/0064729 A1 | 3/2006 | Steading |
| 2006/0098618 A1 | 5/2006 | Bouffioux |
| 2006/0120385 A1 | 6/2006 | Atchison et al. |
| 2006/0126507 A1 | 6/2006 | Nakayasu |
| 2006/0171390 A1 | 8/2006 | La Joie |
| 2006/0179408 A1 | 8/2006 | Ko |
| 2006/0190589 A1 | 8/2006 | Parker |
| 2006/0195464 A1 | 8/2006 | Guo |
| 2006/0200412 A1 | 9/2006 | Fahrny et al. |
| 2006/0215558 A1 | 9/2006 | Chow |
| 2006/0235883 A1 | 10/2006 | Krebs |
| 2007/0039033 A1* | 2/2007 | Ota ..................... 725/115 |
| 2007/0089057 A1 | 4/2007 | Kindig |
| 2007/0104146 A1 | 5/2007 | Hossain et al. |
| 2007/0162502 A1 | 7/2007 | Thomas et al. |
| 2007/0174883 A1 | 7/2007 | McEnroe et al. |
| 2008/0034391 A1* | 2/2008 | Lehman et al. ......... 725/59 |
| 2008/0133701 A1 | 6/2008 | Kazmi et al. |
| 2008/0301736 A1 | 12/2008 | Heilbron et al. |

FOREIGN PATENT DOCUMENTS

WO    WO2005122025(A2)         12/2005

* cited by examiner

402
Configure a Viewing System having a Plurality of Client Devices to Pool Content Consumption Resources using a Plurality of Virtual Tuners

404
Receive an Input at one of the Plurality of Client Devices which Specifies that a Virtual Tuner is to be Locked to a Corresponding Client Device

406
Lock the Virtual Tuner to the Corresponding Client Device such that Another One of the Client Devices is not Permitted to Schedule Consumption of Content using the Locked Virtual Tuner

VIRTUAL TUNER MANAGEMENT

BACKGROUND

Traditionally, in order to receive television programs, users were limited to broadcasts of the television programs that were received via antennas, from cable providers, and so on. For example, the user may have configured a traditional "over-the-air" antenna, connected a cable to a television set, and so on to receive broadcasts of television programs.

Today, however, users are constantly exposed to ever greater varieties and amounts of content. For example, users may now receive and interact with pay-per-view (PPV) content (e.g., movies and sporting events), video-on-demand (VOD), video games, and so on. Additionally, interaction with these varieties of content may be performed in a variety of ways. For example, the use may "time shift" an output of the content (e.g., through use of a pause buffer to pause output of a stream of content), schedule content recordation using a digital video recorder, and so on. The increased varieties of content and techniques that may be utilized to interact with the content, however, may make traditional techniques used to manage the content in the system obsolete, which may limit the provision of and interaction with the content that otherwise would be available to the users.

SUMMARY

Virtual tuner management is described. A viewing system, for instance, may include a plurality of client devices that are configured to render content, such as television programs. The viewing system may pool the resources available from the client devices such that each client device is not limited to functionality that is provided locally by the client device. For example, a client device may schedule recordation of content to be performed by other client devices in the viewing system. To manage content consumption in the viewing system, virtual tuners may be employed, each of which represents an ability of the viewing system to consume a single stream of content (e.g., a television program) provided by a content provider.

The virtual tuners may be utilized to manage which client devices have access to the streaming content. One such technique "locks" a virtual tuner to a particular client device such that the particular client device is able to consume content whenever desired and without negotiating with other client devices in the viewing system. In another technique, the client devices are prioritized to resolve scheduling conflicts. A variety of other techniques are also contemplated to manage the virtual tuners without departing from the spirit and scope thereof.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Users are continually exposed to ever increasing amounts and varieties of content. Additionally, the types of techniques which may be employed to interact with this content are also increasing. For example, a viewing system may include a plurality of client devices which have differing resources to consume content. A first client device, for instance, may include storage to record content while another client device may not have this ability. To share the resources available by the plurality of client devices as a whole, the resources in the viewing system may be pooled such that the resources may be shared, one with another.

Pooling of resources may also be used to provide a wide variety of additional functionality. For example, scheduling of resource consumption in the viewing system may be performed without "local" limitations. For instance, a client device may schedule a recording of content even if that ability is not available locally on the client device. Additionally, even in an instance where the client device does have recording functionality (e.g., through use of local storage as a digital video recorder), the client device may schedule additional recordings to be performed simultaneously elsewhere (e.g., by other client devices) in the viewing system. In this way, the viewing system pools the resources of the client devices such that each client device may draw resources from the pool when desired.

However, the amount of resources that are available to the viewing system may be limited. For example, a certain amount of resources (e.g., bandwidth) may be allocated to each location (e.g., household) serviced by a content provider. The location, on the other hand, may have an ability to consume more resources than are allocated to the location. For instance, the location may have an amount of client devices that as a whole are able to consume more bandwidth than that which is available from the content provider for that location. Additionally, the amount of resources available from the "pool" of resources may be limited. For example, the plurality of client devices, as a whole, may have the ability to store a limited number of streams of content at any one time, i.e., to record content.

Accordingly, techniques may be employed to manage resources available to the viewing system. One such technique involves the use of virtual tuners, each of which represents an ability of the viewing system (via one or more client devices) to consume a stream of content from a content provider. Thus, the virtual tuners provide an abstraction of content consumption which may be scheduled, e.g., to schedule rendering of a stream, recordation of a stream, and so on.

Instances may be encountered, however, in which two or more client devices encounter a scheduling conflict regarding content consumption. For example, the viewing system may be configured to record two streams of content at any one time, but three client devices may request recordation of content at a particular time. In such instances, the management techniques may be used to determine which client device is provided with the ability to consume content. For example, the client devices may be prioritized such that should a conflict occur, a determination may be made as to which client device "wins" and is therefore able to record content, further discussion of which may be found in relation to FIG. 3. In another example, consumption of content may be "locked" such that a particular client device is provided with the ability to consume content regardless of scheduling performed by other client devices, further discussion of which may be found in relation to FIG. 4.

In the following discussion, an exemplary environment is first described which is operable to employ virtual tuner management techniques. Exemplary procedures are then described which may be implemented by the exemplary environment, as well as in other environments. Exemplary systems are then described which may be employed in the exemplary environment.

Exemplary Environment

Figure 1:
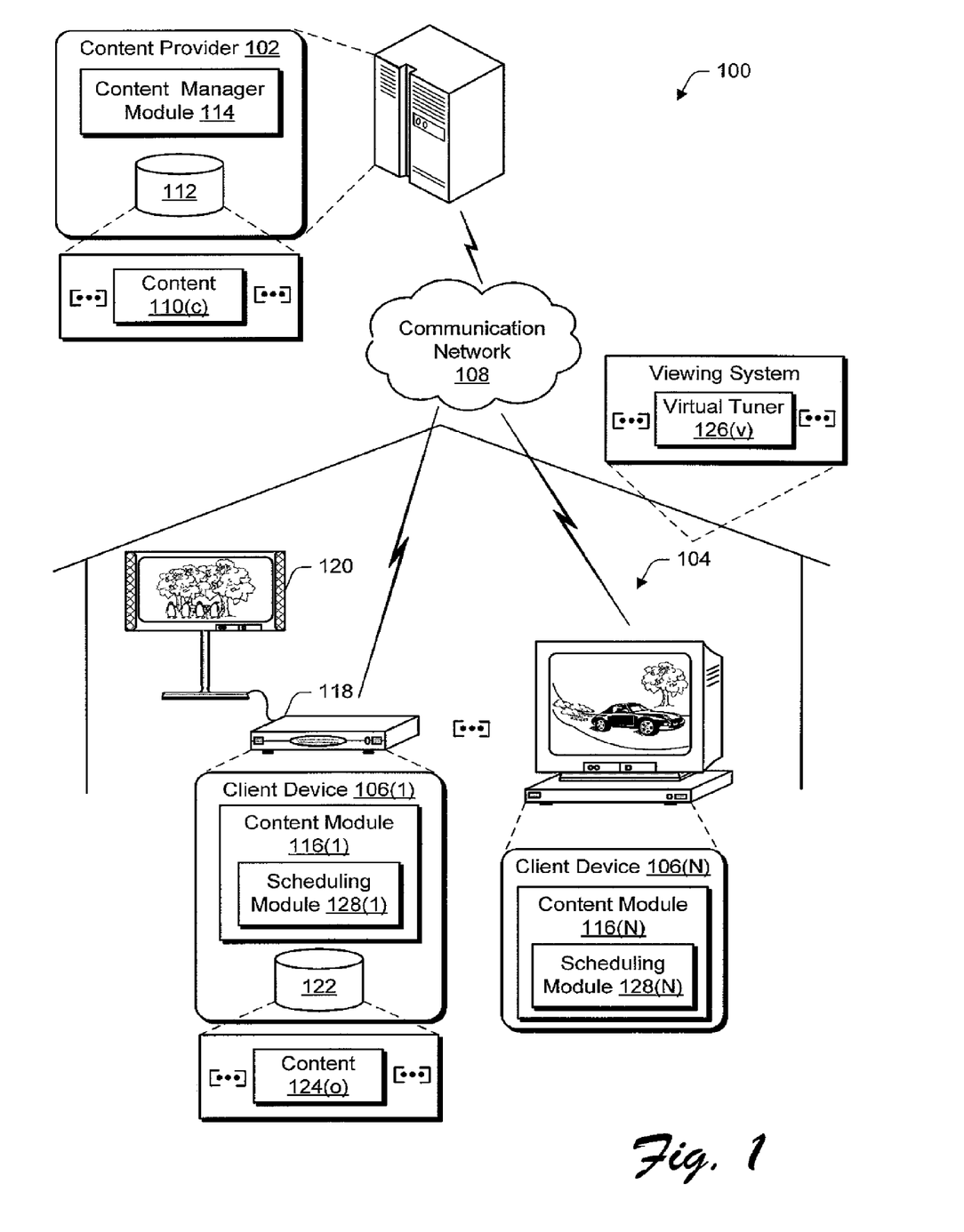
FIG. 1 is an illustration of an environment in an exemplary implementation that is operable to employ virtual tuner management techniques.

FIG. 1 illustrates an environment 100 in an exemplary implementation that is configured to employ virtual tuner management techniques. Although the environment 100 of FIG. 1 is illustrated as an IP-based television (IPTV) environment, the environment 100 may assume a wide variety of other configurations, such as a traditional television broadcast environment, a broadcast environment with back-channel communication capabilities, and so on.

The environment 100 includes a content provider 102 (which may be representative of multiple content providers) and a viewing system 104 that can include any number of client devices, which are illustrated as client devices 106(1)-106(N). The viewing system 104 is illustrated as a household viewing system that has several viewing areas (e.g., different rooms) for viewing content, such as television programming. Although the viewing system 104 is depicted as employed within a particular premises (e.g., the household), it should be apparent that the viewing system 104 may also be employed in multiple premises without departing from the spirit and scope thereof.

The viewing system 104 is configured for communication with the content provider 102 via a communication network 108 which, in this example, is an IP-based network. The content provider 102 is illustrated as including a variety of content 110(c) (where "c" can be any integer from one to "C") that is stored in storage 112, e.g., a computer-readable medium.

The content 110(c) may be configured for distribution over the communication network 108 (e.g., through execution of a content manager module 114) in a variety of ways. For example, the content 110(c) may include any form of television programs, commercials, music, movies, video on-demand (VOD), pay-per-view (PPV), movies and other media content, recorded media content, interactive games, network-based applications, and any other similar audio, video, and/or image content. In addition, content 110(c) in general may include music streamed from a computing device to one or more of the client devices 106(1)-106(N), such as a television-based set-top box, and may also include video-on-demand (VOD) media content delivered from a server, a photo slideshow, and any other audio, video, and/or image content received from any type of content source.

To control consumption of the content 110(c) received from over the communication network 108 (as well as content that is available locally), each of the client devices 106(1)-106(N) is illustrated as including a respective content module 116(1)-116(N). The content modules 116(1)-116(N) are executable to provide a wide variety of functionality related to content consumption. For example, the content modules 116(1)-116(N) may be executed to communicate with the content provider 102 (and more particularly the content manager module 114) to request particular content 110(c). For instance, the content module 116(1), when executed, may provide authentication and billing information to order VOD, PPV, and so on. In another example, the content modules 116(1)-116(N) are executable to decompress and decrypt content 110(c) received from the communication network 108 and provide other digital rights management functionality. A variety of other examples are also contemplated.

Client device 106(1), for instance, is illustrated as being implemented by a set-top box 118 that is communicatively coupled to a display device. 120, such as any type of television, monitor, or similar television-based display system that renders audio, video, and/or image data. Client 106(1) is also illustrated as including digital video recorder (DVR) functionality. For example, client device 106(1), through execution of the content module 116(1), may record content 110(c) received from the content provider 102 over the communication network 108 in storage 122 as content 124(o), where "o" can be any integer from one to "O". Therefore, client device 106(1) may output the content 124(o) from storage 122 at a later time as desired by a user of the client device 106(1). Further, the client device 106(1) (e.g., through execution of the content module 116(1)) may provide other DVR related functionality, such as "time shifting" an output of the content 124(o), e.g., by pausing playback of content 124(o) through use of a pause buffer.

The viewing system 104 may also utilize a variety of other techniques to record content. For example, the storage 122 may be implemented as an independent component of the viewing system 104 and connected to the manager client device 106(1). Alternatively, the storage 122 may be implemented as a component of the manager client device 106(1) as illustrated, which manages recordings initiated from any of the other remote client devices 106(2)-106(N). In yet another embodiment, the storage 122 may be a distributed recording system where any one or more of the client devices 106(1)-106(N) include recording media that is centrally managed by the manager client device 106(1). In still yet another embodiment, the storage 122 may be implemented by the content provider 102 (e.g., when configured as a head end) and managed by the manager client device 106(1) as a "network digital video recorder" (NDVR). In other words, the storage 122 may also be provided as a "drive in the sky" that is responsive to one or more of the client devices 106(1)-106(N).

Although a few examples of client devices 106(1)-106(N) have been described, the client devices 106(1)-106(N) may also be configured in a wide variety of other ways, such as wireless phones, game consoles, "media centers", and so on. For example, client device 106(N) is illustrated in FIG. 1 as a set-top box that does not include DVR functionality, unlike client device 106(1) of FIG. 1. Thus, the client devices 106(1)-106(N) may be implemented in a variety of different ways to provide different amounts of functionality (e.g., "thin" or "thick" devices) with any number and combination of differing components, an example of which is further described with reference to the exemplary client device 106(n) shown in FIG. 5. Likewise, the environment 100 may be implemented with any number and combination of differing components, an example of which is described below with reference to the exemplary entertainment and information system 600 shown in FIG. 6.

Content 110(c) may be allocated to the client devices 106(1)-106(N) by the content provider 102 in a variety of ways. For example, each of the premises (e.g., the illustrated household) serviced by the content provider 102 may be allocated a certain amount of bandwidth. The premises may then use one or more techniques to determine which clients 106(1)106(N) receive portions of the allocated bandwidth. In other words, the viewing system 104 (itself) may allocate which portion of the bandwidth allocated to viewing system 104 is provided to particular client devices 106(1)-106(N). The amount of content that is allocated to the viewing system 104, however, may be less than the amount of content that may be consumed by the viewing system, e.g., the viewing system may include more client devices that the number of streams that are available from the content provider 102. Additionally, the functionality provided by each of the client devices may be different, one to another, as previously described.

Therefore, in order to manage content consumption in the viewing system 104 (and more particularly by client devices 106(1)-106(N) in the viewing system) and to share functionality, one or more virtual tuners 126(v) may be employed, where "v" can be any integer from one to "V". Each of the virtual tuners 126(v) is representative of the ability of at least a portion of the viewing system 104 to consume a steam of content from the content provider 102. For example, use of a virtual tuner 126(v) may be scheduled by the client device 106(N) to render content 110(c). Likewise, another one of the virtual tuners 126(v) may be scheduled by the client device 106(1) to store the content 10(c) as content 124(o) in storage 122. Further, client device 106(1) may schedule use of another one of the virtual tuners 126(v) to also render content.

The client devices 106(1)-106(N) may also schedule use of the virtual tuners 126(v) for consumption of content beyond that which is available from the scheduling client devices 106(1)-106(N), themselves. For example, client device 106(N) may execute a corresponding scheduling module 128(N) to schedule recordation of a plurality of streams of content at the same time, even though the client device 106(N) does not have a local storage device. The client device 106(1) may also perform similar scheduling through execution of its respective scheduling module 128(1). Thus, the client devices 106(1)-106(N) may "draw from the pool" of resources provided collectively by the plurality of client devices 106(1)-106(N) in the viewing system 104.

Because the resources are pooled in the viewing system 104, management techniques are used to avoid conflicts and to efficiently use resources in the viewing system 104 by each of the client devices 106(1)-106(N). For example, the client devices 106(1)-106(N) may be prioritized, one to another, such that when a scheduling conflict is encountered, a "winner" may be determined, further discussion of which may be found in relation to FIG. 3.

In another example, a virtual tuner 126(v) may be "locked" to a particular client device 106(1). For instance, client device 106(N) may be located in a parent's bedroom in a household. Therefore, to ensure that content 110(c) is available to the client device 106(N) whenever desired, the virtual tuner 126(v) may be locked to the client device 106(N) such that client device 106(1) may not schedule use of the virtual tuner 126(v), e.g., through execution of the scheduling module 128(1). Further discussion of virtual tuner locking may be found in relation to FIG. 4.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the content consumption and management techniques described below are platform-independent, meaning that the techniques may be implemented on a variety of commercial computing platforms having a variety of processors.

Figure 2:
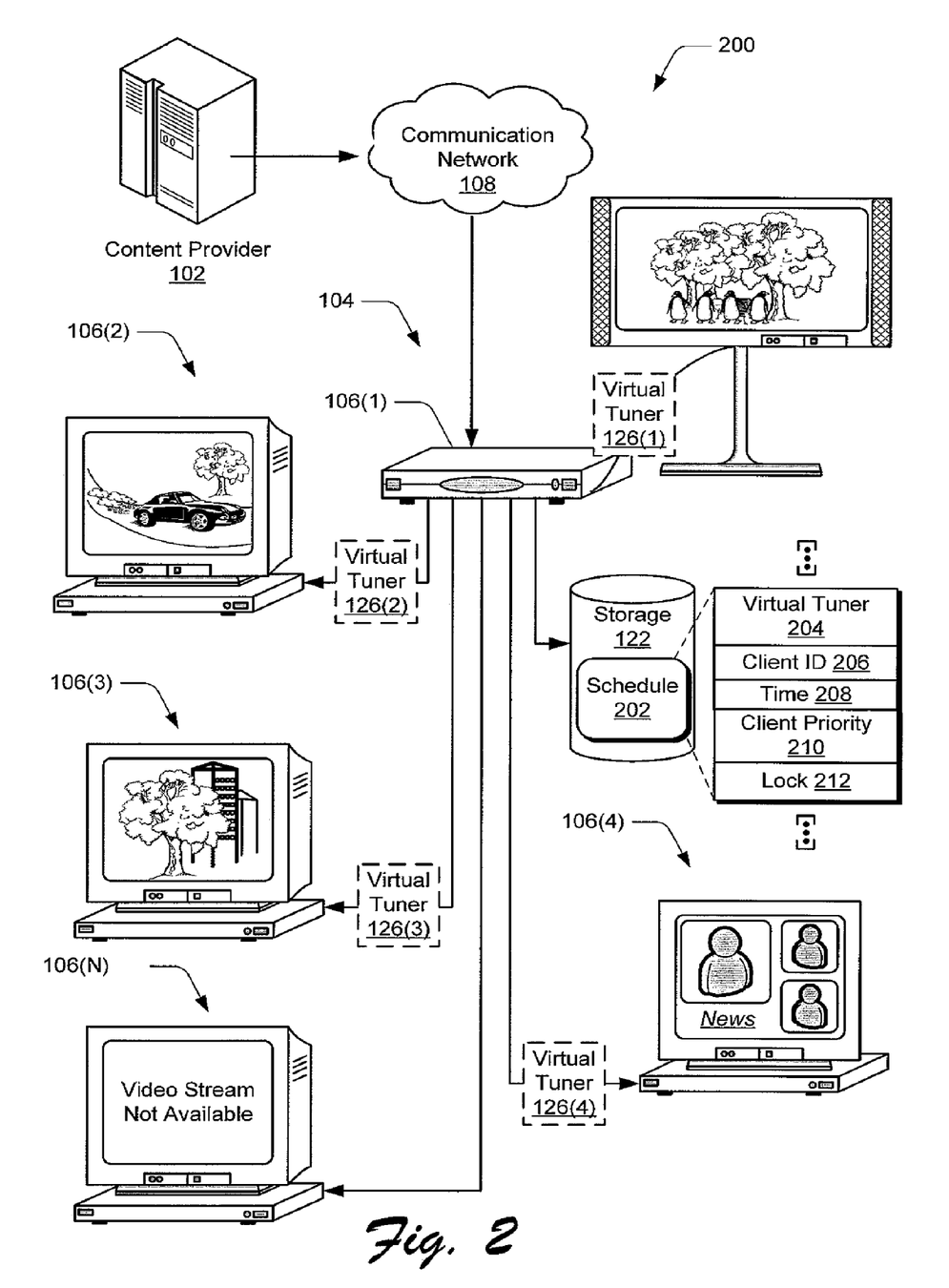
FIG. 2 is an illustration of an exemplary implementation of a system showing virtual tuner usage to consume content from a content provider by a viewing system of FIG. 1 in greater detail.

FIG. 2 illustrates an exemplary implementation of a system 200 showing virtual tuner usage to consume content from the content provider 102 by the viewing system 104 of FIG. 1 in greater detail. The illustrated viewing system 104 includes a plurality of client devices 106(1), 106(2), 106(3), 106(4) and 106(N). In this system, client device 106(1) is a manager client device that arbitrates usage of four virtual tuners 126(1)-126(4). The virtual tuners 126(1)-126(4) are illustrated in phantom to indicate that the functionality represented by the virtual tuners 126(1)-126(4) is not necessarily available locally from the corresponding client device 106(1)-106(4). For instance, the functionality may be drawn from the "pool" of resources available in the viewing system 104 as previously described.

By arbitrating control of the four virtual tuners 126(1)-126(4), the manager client device 106(1) may control consumption of four (4) content streams from the content provider 102 via the communication network 108. For example, the content streams may be obtained by "remote" client devices 106(2)-106(N) (i.e., client devices that do not have the authority to arbitrate control) through the manager client device 106(1). In another example, the streams are managed by the manager client device 106(1), but the remote client devices 106(2)-106(N) receive the streams directly from the content provider 102 via the communication network 108. A variety of other examples are also contemplated.

Although the content streams are not shown specifically, the illustrated communication links illustrate various communication links which are configured to communicate the content streams. Additionally, the communication links are not intended to be interpreted as a one-way communication link, but rather may also represent two-way communication. A viewing selection from a first content stream is shown as being rendered for viewing on display device at the manager client device 106(1). A second content stream is illustrated as directed from the manager client device 106(1) to the remote client device 106(2). Similarly, a third content stream is directed from the manager client device 106(1) to the remote client device 106(3) and a viewing selection from the third content stream is shown as being rendered for viewing on a respective display device. Likewise, a fourth content stream is directed from the manager client device 106(1) to the remote client device 106(4) and a viewing selection from the fourth content stream is shown for viewing on a respective display device.

As previously described, the available bandwidth for the viewing system 104, however, may not be able to accommodate as many content streams as there are client devices. As illustrated in FIG. 2, for instance, it is not unusual for a household to have five (5) or more televisions in various rooms and at various locations throughout the household. In this instance, the number of client devices exceeds the number of content streams allocated to the viewing system 104 from the content provider 102. For example, the viewing system 104 is depicted as including at least a fifth client device 106(N). The corresponding display device of the client device 106(N) indicates that a video stream is not available, because the content streams consumed (e.g., the four content streams) via the virtual tuners 126(1)-126(4) have already been scheduled by the other client devices 106(1)-106(4).

The manager client device 106(1) is illustrated as maintaining a schedule 202 of consumption portioned through use of the virtual tuners 126(1)-126(4). For example, the schedule 202 may include a plurality of entries which identify a virtual tuner 204 (e.g., virtual tuners 126(1)-126(4)), a client ID 206 of the client device (e.g., clients 106(1)-106(4)) using the identified virtual tuner, and a time 208 during which the identified virtual tuner 204 is being used.

In order to resolve scheduling conflicts, the schedule 202 may also identify a client priority 210 of the client identified by the client ID 206 that scheduled the identified virtual tuner 204. For example, each of the client devices 106(1)-106(4) may be given a numerical priority for controlling consumption of the virtual tuners 126(1)-126(4). When client device 106(4), for instance, schedules use of the virtual tuner 126(4), the client priority 210 assigned to the client device 106(4) and the client ID 206 are stored in the schedule 202. When client 106(N) attempts to schedule use of a virtual tuner, however, each of the virtual tuners 126(1)-126(4) have already been scheduled for use by other client devices 106(1)-106(4). Therefore, to manage which client device 106(1)-106(4), 106(N) consumes content, a client priority of the client device 106(N) may be compared with each client priority 210 in the schedule 202 to determine if the client 106(N) may "override" a preexisting scheduled use of a virtual tuner. In this way, the priorities assigned to the clients may be used to determine "who wins" when attempting to use resources of the viewing system 104 to consume content from the content provider 102.

In another example, dynamic priorities may be established, such as by assigning priorities to clients based on a period of time, during which, the respective client devices have not received a user input. Notifications may also be used, therefore, instead of automatically "taking" a virtual tuner from the client having the lowest priority, a user of that client may be asked permission. A variety of other examples are also contemplated, further discussion of which may be found in relation to FIG. 3.

The schedule 202 may also include a lock entry 212 which indicates that the identified virtual tuner 204 is locked to the identified client 206 device. For example, the household represented in FIG. 2 may include separate rooms, in which, each of the respective client devices 106(1)-106(N) is located. To ensure that content may be consumed in a particular location in the household when desired (e.g., a parent's bedroom), a user (e.g., a parent) may lock use of a virtual tuner (e.g., virtual tuner 126(1)) to a particular client device 106(1) that is positioned in a particular location, e.g., the parent's bedroom. Therefore, the locked virtual tuner 126(1) is not made available to other client devices 106(2)-106(N) in the viewing system. In an implementation, the locked virtual tuner (e.g., virtual tuner 126(1) in this example) is not made available to the other client devices 106(2)-106(N) even when it is not being used by the corresponding client device, e.g., client device 106(1). Additionally, the client device 106(1) having the locked virtual tuner 126(1) may still leverage the other virtual tuners 126(2)-126(4), if available. Therefore, in this example the client device 106(1) has access to all four virtual tuners 126(1)-126(4), while the other client devices 106(2)-106(N) have access to the "unlocked" virtual tuners 126(2)-126(4). A variety of other examples are also contemplated, further discussion of which may be found in relation to FIG. 4.

Exemplary Procedures

The following discussion describes virtual tuner management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
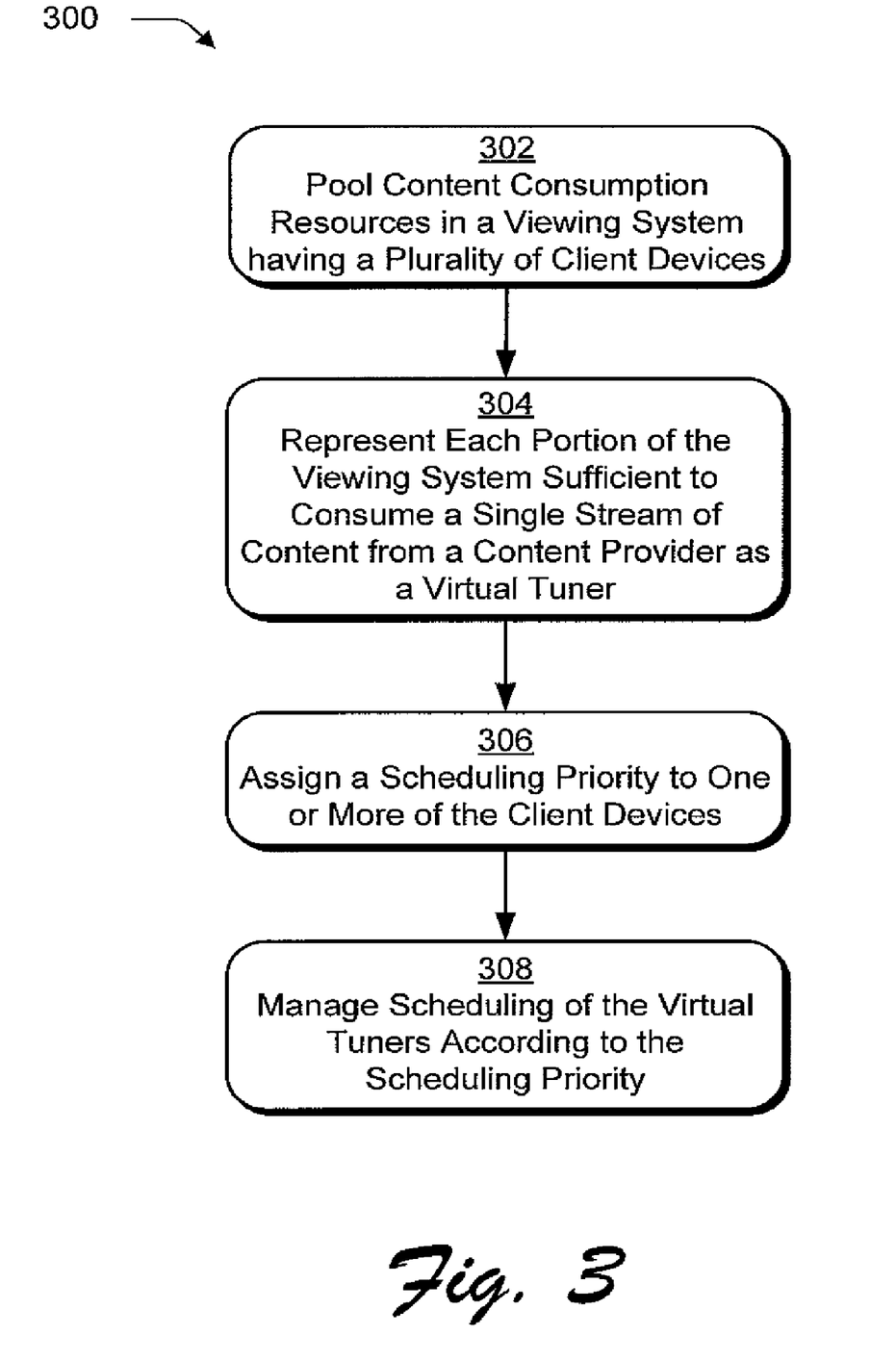
FIG. 3 is a flow diagram depicting a procedure in an exemplary implementation in which resources in a viewing system to consume content are pooled by employing a plurality of virtual tuners, the scheduling of which is managed based on a scheduling priority.

FIG. 3 depicts a procedure 300 in an exemplary implementation in which resources in a viewing system to consume content are pooled by employing a plurality of virtual tuners, the scheduling of which is managed based on a scheduling priority. Content consumption resources are pooled in a viewing system having a plurality of client devices (block 302). For example, the viewing system 104 may include a plurality of client devices 106(1)-106(N) which have content consumption abilities, such as to render content 110(c) from the content provider 102, store the content 110(c) in storage to provider DVR functionality, and so on. Additionally, the functionality provided by the client devices may be different, one to another, such that one client device in the viewing system may have content consumption resources that are not available on another client device, by itself. These client devices 106(1)-106(N) may communicate, one with another, to "pool" the resources such that each of the client devices 106(1)-106(N) has access to functionality available from the viewing system 104 as a whole.

Each portion of resources of the viewing system sufficient to consume a single stream of content from a content provider is represented as a virtual tuner (block 304). Continuing with the previous example, the viewing system 104, through use of the client devices 106(1)-106(N), may render and record content from the content provider 102. Resources available to consume the content 102 are portioned into virtual tuners which may be "drawn upon" by any of the client devices 106(1)-106(N) in the viewing system 104. Thus, each of the client devices 106(1)-106(N) may access resources of the viewing system 104 provided by other client devices.

In an implementation, the number of virtual tuners available in the viewing system 104 is also limited by the amount of content 110(c) available from the content provider 102. For example, the content provider 102 may be configured to provide four streams of content to the viewing system 104 at any one time. Therefore, the number of virtual tuners in this example may be limited to four. A variety of other examples are also contemplated.

A scheduling priority is assigned to one or more of the client devices (block 306). For example, each of the client devices 106(1)-106(N) may be assigned a unique numerical priority, such as "1", "2", "3", "4" and "5" for client devices 106(1), 106(2), 106(3), 106(4) and 106(N) of FIG. 2, respectively. Scheduling of the virtual tuners may then be managed according to the scheduling priority (block 308). In this example, the priority of the client devices 106(1)-106(N) goes from "low" to "high" such that a lower number "wins"

over a higher number. Therefore, when a scheduling conflict is encountered, the priorities assigned to the client devices 106(1)-106(N) may be used to resolve the conflicts. For example, a client device having a "higher" priority may override scheduled consumption by a client device having a "lower" priority, even if previously scheduled. A variety of other examples which use priorities to resolve scheduling conflicts in the use of virtual tuners are also contemplated without departing from the spirit and scope thereof, such as through use of dynamic prioritization as previously described.

Figure 4:
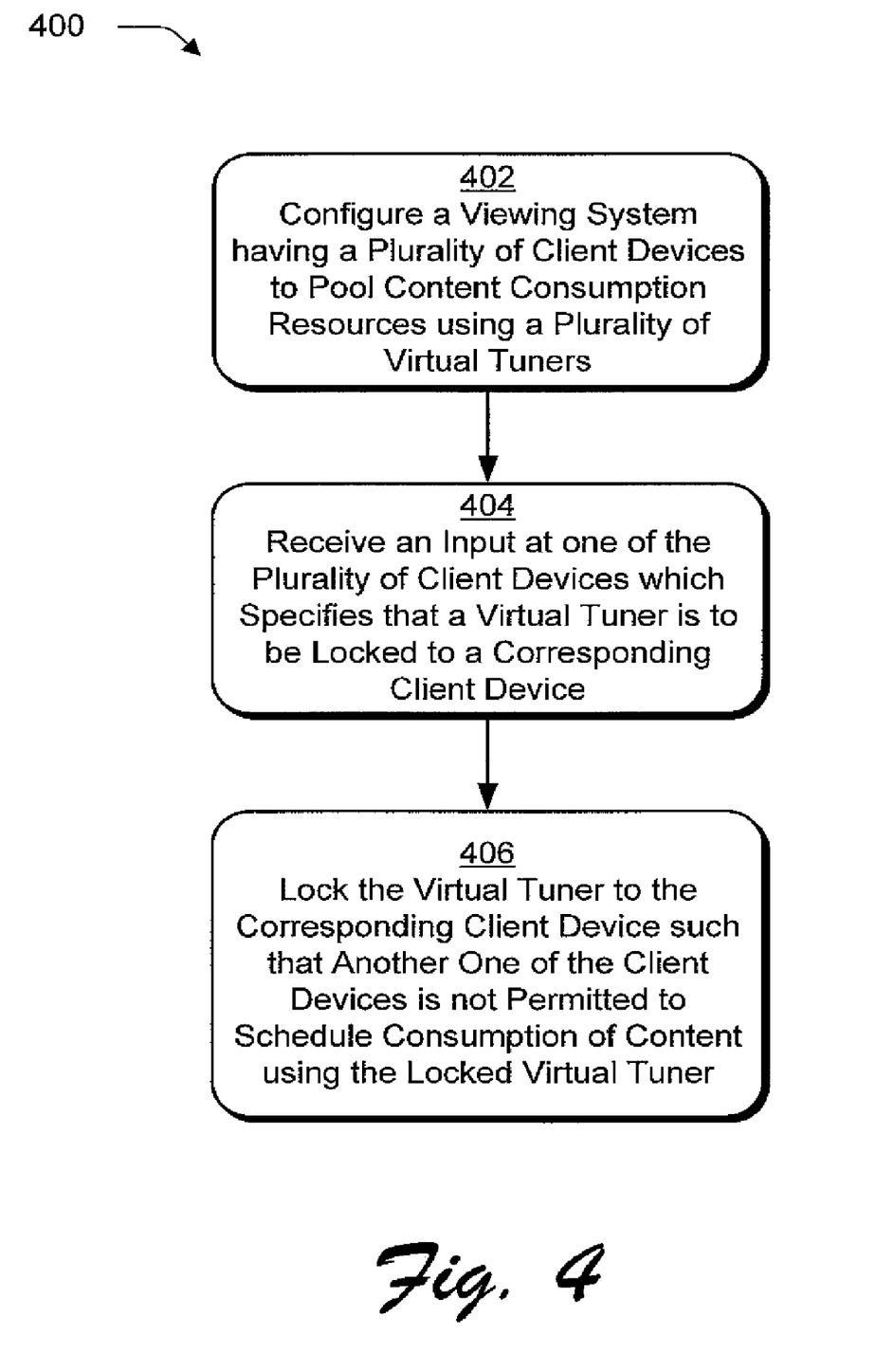
FIG. 4 is a flow diagram depicting a procedure in an exemplary implementation in which a virtual tuner, which represents resources available in a viewing system to consume a single stream of content from a content provider, is locked for use by a particular client device in the viewing system.

FIG. 4 depicts a procedure 400 in an exemplary implementation in which a virtual tuner, which represents resources available in a viewing system to consume a single stream of content from a content provider, is locked for use by a particular client device in the viewing system. A viewing system having a plurality of client devices is configured to pool content consumption resources using a plurality of virtual tuners (block 402). As previously described, the client devices 106(1)-106(N) may communicate to share resources such that functionality available in the viewing system 104 to consume content is available to each of the client devices 106(1)-106(N) in the viewing system 104.

An input is received at one of the plurality of client devices which specifies that a virtual tuner is to be locked to a corresponding client device (block 404). For example, a user may interact with client device 106(1) and indicate that virtual tuner 126(1) is to be locked to that client device. Although in this example, the user locks the virtual tuner to the client device, with which, the user is interacting, it should be apparent that the user may lock other client devices 106(2)-106(N) to virtual tuners through interaction with the client device 106(1) without departing from the spirit and scope thereof.

The virtual tuner is locked to the corresponding client device such that another one of the client devices is not permitted to schedule consumption of content using the locked virtual tuner (block 406). For example, after the virtual tuner 126(1) is locked to client device 106(1), that virtual tuner is not available for scheduling by other client devices 106(2)-106(N) to consume content. Therefore, the other client devices 106(2)-106(N) may schedule content consumption through use of virtual tuners 126(2)-126(4), the scheduling of which may be determined through use of the prioritization techniques previously described in relation to FIG. 3. Additionally, client device 106(1) may also schedule use of the other virtual tuners 126(2)-126(4) when scheduling of additional content consumption is desired. A variety of other examples are also contemplated.

Exemplary Systems

Figure 5:
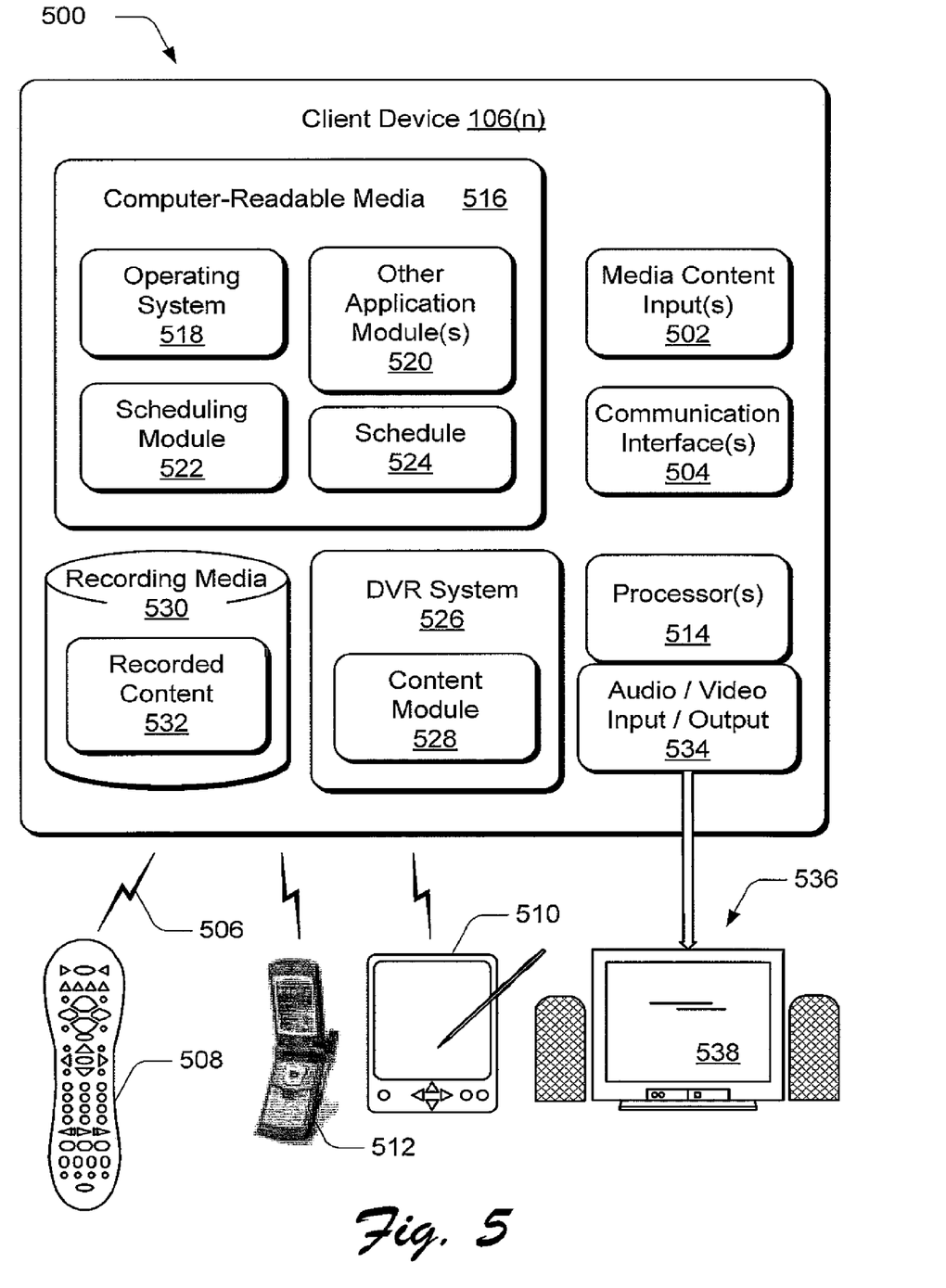
FIG. 5 illustrates an exemplary implementation of a client device of FIGS. 1 and 2 in greater detail.

FIG. 5 illustrates an exemplary implementation 500 of a client device 106(n) (which may or may not correspond to one or more of the client devices 106(1)-106(N) of FIG. 2) in greater detail. The client device 106(n) may be implemented as any form of a computing, electronic, and/or television-based client device.

Client device 106(n), as illustrated in FIG. 5, includes one or more media content inputs 502 which may include Internet Protocol (IP) inputs over which streams of media content are received via an IP-based network. Client device 106(n) further includes communication interface(s) 504 which can be implemented as any one or more of a serial and/or parallel interface, a wireless interface, any type of network interface, a modem, and as any other type of communication interface. A wireless interface enables client device 106(n) to receive control input commands 506 and other information from an input device, such as from remote control device 508, PDA (personal digital assistant) 510, cellular phone 512, or from another infrared (IR), 802.11, Bluetooth, or similar radio frequency (RF) input device.

A network interface provides a connection between the client device 106(n) and a communication network by which other electronic and computing devices can communicate data with device 106(n). Similarly, a serial and/or parallel interface provides for data communication directly between client device 106(n) and the other electronic or computing devices. A modem facilitates client device 106(n) communication with other electronic and computing devices via a conventional telephone line, a digital subscriber line (DSL) connection, cable, and/or other type of connection.

Client device 106(n) also includes one or more processors 514 (e.g., any of microprocessors, controllers, and the like) which process various computer executable instructions to control the operation of client device 106(n), such as to communicate with other electronic and computing devices. Client device 106(n) can be implemented with computer-readable media 516, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. It should be apparent that although a single computer-readable media 516 is illustrated, the computer readable media 516 may be representative of multiple types and combinations of computer-readable media.

Computer-readable media 516 provides data storage mechanisms to store various information and/or data such as software applications and any other types of information and data related to operational aspects of client device 106(n). For example, an operating system 518 and/or other application modules 520 can be maintained as software applications with the computer-readable media 516 and executed on the processor(s) 514.

For example, one or more of the other application modules 520 can be implemented as a program guide application that processes program guide data and generates program guides for display. The program guides enable a viewer to navigate through an onscreen display and locate broadcast programs, recorded programs, video-on-demand (VOD), movies, interactive game selections, network-based applications, and other media access information or content of interest to the viewer. Likewise, the computer-readable media 516 may also store the scheduling module 522 and/or schedule 524 that is used to schedule use of the virtual tuners as previously described in relation to FIGS. 1-4. The client device 106(n) may also include a DVR system 526 with the content module 528 (which may or may not correspond to the content modules 116(1)-116(N) of FIG. 1) and recording media 550 (which may or may not correspond to the storage 122 of FIG. 1) to maintain recorded content 552.

The client device 106(n), as illustrated, also includes an audio and/or video input/output 554. The audio/video input/output 554 may be utilized for a variety of purposes, such as to provide audio and video to an audio rendering and/or display system 556 and/or to other devices that process, display, play, and/or otherwise render audio, video, and image data. Video signals and audio signals, for instance, may be communicated from client device 106(n) to a television 558 (or to other types of display devices) via an RF (radio frequency)

link, S-video link, composite video link, component video link, analog audio connection, or one or more other such communication links.

Figure 6:
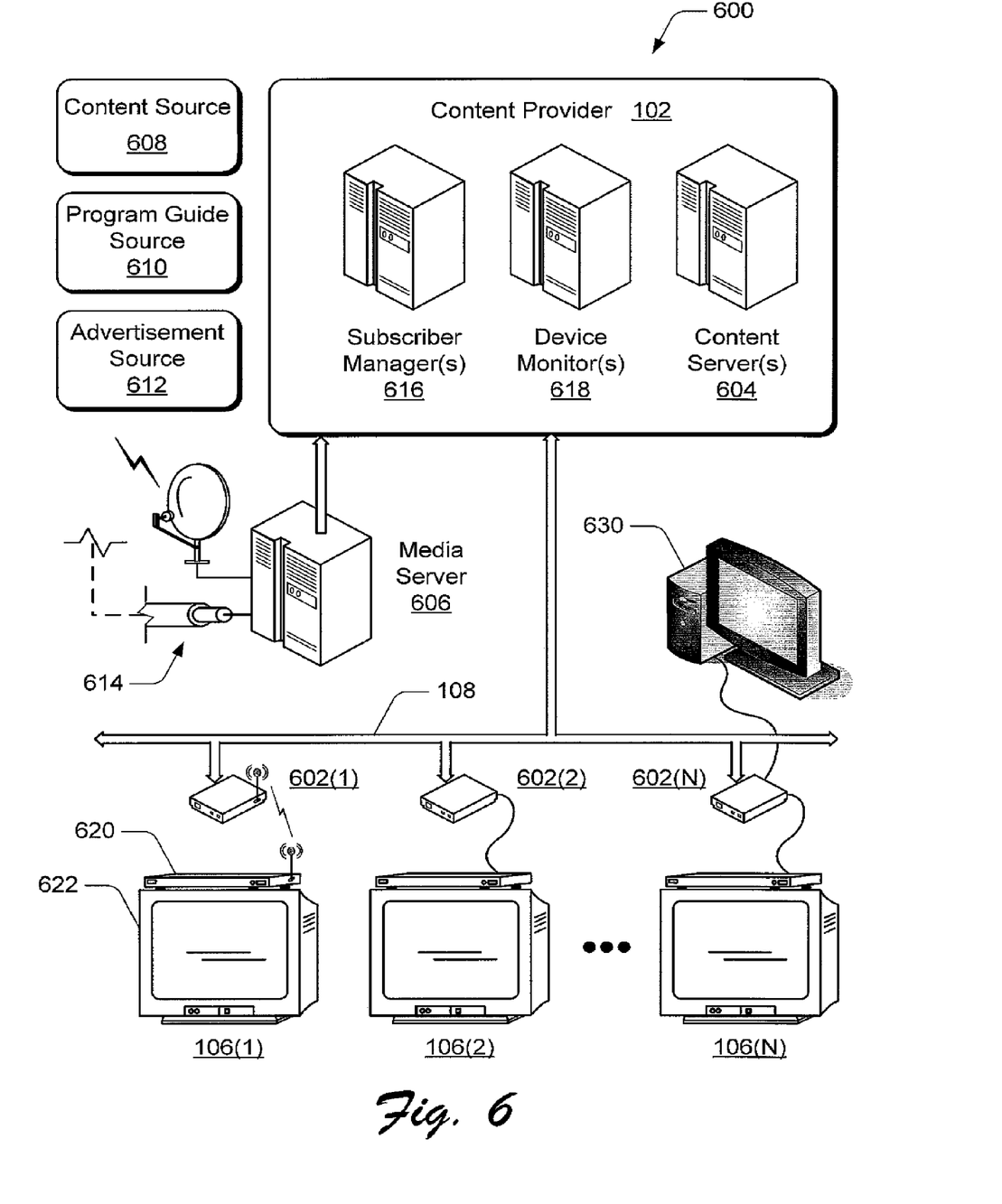
FIG. 6 illustrates a system in an exemplary implementation in which a content provider of FIGS. 1 and 2 is shown in greater detail.

FIG. 6 illustrates a system 600 in an exemplary implementation in which the content provider 102 is shown in greater detail. System 600 facilitates the distribution of program content, program guide data, and advertising content to multiple viewers and to multiple viewing systems. System 600 includes the content provider 102 and the plurality of client devices 106(1)-106(N), each being configured for communication via an IP-based network 108. Each of the client devices 106(1)-106(N), for instance, may receive one or more content streams from the content provider 102 and then arbitrate stream allocation to distribute the content streams (e.g., one to each) to one or more other remote client devices in the viewing system 104.

The communication network 108 may be implemented in a wide variety of ways, such as a wide area network (e.g., the Internet), an intranet, a Digital Subscriber Line (DSL) network infrastructure, a point-to-point coupling infrastructure, and so on. Additionally, the communication network 108 can be implemented using any type of network topology and any network communication protocol, and can be represented or otherwise implemented as a combination of two or more networks. A digital network can include various hardwired and/or wireless links 602(1)-602(N), routers, gateways, and so on to facilitate communication between content provider 102 and the client devices 106(1)-106(N4). The client devices 106(1)-106(N) receive content (e.g., television programs, program guide data, advertising content, closed captions data, and the like) from content server(s) 604 of the content provider 602 via the communication network 108.

System 600 may also include a variety of servers to provide functionality, such as to obtain and provide specific types of content. For example, the illustrated system 600 includes a media server 606 that receives program content from a content source 608, program guide data from a program guide source 610, and advertising content from an advertisement source 612. In an embodiment, the media server 606 represents an acquisition server that receives the audio and video program content from content source 608, an EPG server that receives the program guide data from program guide source 610, and/or an advertising management server that receives the advertising content from the advertisement source 612.

The content source 608, the program guide source 610, and the advertisement source 612 control distribution of the program content, the program guide data, and the advertising content to the media server 606 and/or to other servers. The program content, program guide data, and advertising content is distributed via various transmission media 614, such as satellite transmission, radio frequency transmission, cable transmission, and/or via any number of other wired or wireless transmission media. In this example, media server 606 is shown as an independent component of system 600 that communicates the program content, program guide data, and advertising content to content provider 102. In an alternate implementation, media server 606 can be implemented as a component of content provider 102.

Content provider 102 in the system 600 of FIG. 6 is representative of a headed service in a television-based content distribution system, for example, that provides the program content, program guide data, and advertising content to multiple subscribers, e.g., the client devices 106(1)-106(N). The content provider 102 may be implemented in a variety of ways, such as a satellite operator, a network television operator, a cable operator, and the like to control distribution of program and advertising content, such as movies, television programs, commercials, music, and other audio, video, and/or image content to the client devices 106(1)-106(N).

Content provider 102 includes various components to facilitate content processing and distribution, such as a subscriber manager 616, a device monitor 618, and the content server 604. The subscriber manager 616 manages subscriber data, and the device monitor 618 monitors the client devices 106(1)-106(N) (e.g., and the subscribers), and maintains monitored client state information.

Although the various managers, servers, and monitors of content provider 102 (to include the media server 606 in an embodiment) are illustrated and described as distributed, independent components of content provider 102, any one or more of the managers, servers, and monitors can be implemented together as a multi-functional component of content provider 102.

The client devices 106(1)-106(N), as previously described, may be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client device 106(N) is implemented via a computing device. Additionally, any of the client devices 106(1)-106(N) can implement features and embodiments of manager/remote content architecture as described herein.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
  pooling content consumption resources in a viewing system having a plurality of client devices, wherein:
    the pooled resources are portioned via a plurality of virtual tuners, each of which representing an ability to consume a single corresponding stream of content from a content provider over a communication network; and
    each client device of said plurality of client devices being configured to schedule consumption of the content by one or more of the virtual tuners;
  managing scheduling of use of the plurality of virtual tuners by the plurality of client devices accordingly to a scheduling priority assigned to each use by the client devices; and
  locking a client device of the plurality of client devices to a corresponding virtual tuner of the one or more virtual tuners such that a differing client device of the plurality of client devices is not permitted to schedule content consumption using the corresponding virtual turner during periods when the corresponding virtual tuner is not being employed by the corresponding client device.

2. A method as described in claim 1, wherein at least one said client device is scheduled use of at least two said virtual tuners, at least one of which is used to store content.

3. A method as described in claim 1, wherein the plurality of virtual tuners, as a whole, approximate a predetermined limit in an amount of bandwidth available to stream the content from the content provider to the viewing system.

4. A method as described in claim 1, wherein the managing, through use of scheduling priority, resolves scheduling conflicts between at least two said client devices to store content by the viewing system.

5. A method as described in claim 1, wherein the scheduling of the consumption by the client devices may use resources that are not available locally from the client device which performs the scheduling.

6. A method as described in claim 1, wherein at least one said client device is configured to schedule an amount of content consumption for a particular time that is greater than an amount of content that can be consumed by the at least one said client device at the particular time.

7. A method as described in claim 1, wherein content consumption includes rendering the content.

8. A method as described in claim 1, wherein content consumption includes storing the content.

9. A method comprising:
  receiving an input at one of a plurality of client devices in a viewing system, wherein:
    each client device of the plurality of client devices are configured to render output received from a content provider over a communication network;
    a plurality of virtual tuners are available in the viewing system to consume the content;
    one or more of the plurality of client devices are configured to schedule consumption of the content by the plurality of virtual tuners;
    the input specifies that at least one of the plurality of virtual tuners is to be locked to a corresponding client device of the plurality of client devices;
  locking a corresponding client device of the plurality of client devices to a first subset of said plurality of virtual tuners such that only the corresponding client device is permitted to schedule consumption of the stream of content using the first subset of virtual tuners, while also being permitted to schedule consumption of the stream of content using a second subset, differing from the first subset, of the plurality of virtual tuners, with remaining client devices of the plurality of client devices being permitted to only schedule consumption of the stream of content using the second subset; and
  with a prioritization hierarchy determining a scheduling priority of the remaining client devices of the plurality of client devices to schedule consumption of the stream of content using the second subset of the plurality of virtual tuners, the prioritization hierarchy being time dependent.

10. A method as described in claim 9, wherein the plurality of virtual tuners, as a whole, approximate a predetermined limit in an amount of bandwidth available to stream the content from the content provider to the viewing system.

11. A method as described in claim 10, wherein the predetermined limit is less than an amount of bandwidth that may be consumed by the plurality of client devices.

12. A method as described in claim 9, further comprising:
  managing scheduling of the plurality of virtual tuners by the plurality of client devices accordingly to a scheduling priority assigned to use by the client devices; and
  at least one said client device is configured to consume content concurrently using at least two said virtual tuners.

13. A method as described in claim 9, one or more said client devices are configured to schedule the consumption of the content that are not available locally from the client device which performs the scheduling.

14. A viewing system comprising a plurality of client devices, wherein:
  the plurality of client devices pool resources to consume streams of content received from a content provider over a communication network;
  the resources are portioned via a plurality of virtual tuners, each of which representing an ability to consume a single corresponding stream of content of said streams of content;
  each client device of said plurality of client devices being configured to schedule the consumption of the content by one or more of the virtual tuners;
  a first subset of said plurality of virtual tuners being lockable to a corresponding client device of the plurality of client devices, such that only the corresponding client device is permitted to schedule consumption of the stream of content using the first subset of the plurality of virtual tuners while also being permitted to schedule consumption of the stream of content using a second subset, differing from the first subset, of the plurality of virtual tuners, with remaining client devices of the plurality of client devices being permitted to only schedule consumption of the stream of content using the second subset; and
  wherein a user interacting with the corresponding client device to indicate the first subset of the plurality of virtual tuners is lockable to the corresponding client device and a prioritization hierarchy determining a scheduling priority of the remaining client devices of the plurality of client devices to schedule consumption of the stream of content using the second subset of the plurality of virtual tuners.

15. A viewing system as described in claim 14, wherein an amount of bandwidth available to stream the content from the content provider to the plurality of client devices has a predetermined limit.

16. A viewing system as described in claim 14, wherein:
  the content provider is a headend; and
  at least a portion of the content is a television program.

17. A viewing system as described in claim 14, wherein the viewing system is an internet protocol television (IP-TV) system.

18. A viewing system as described in claim 14, wherein the scheduling of the content consumption includes scheduling of storage of the content by one or more said client devices.

19. A viewing system as described in claim 14, wherein the corresponding said client device is also configured to schedule consumption of content by another said virtual tuner.

* * * * *

UNITED STATES PATENT AND TRADEMARK OFFICE
CERTIFICATE OF CORRECTION

PATENT NO. : 7,669,222 B2  
APPLICATION NO. : 11/275577  
DATED : February 23, 2010  
INVENTOR(S) : Elizabeth Rose McEnroe et al.

Page 1 of 1

It is certified that error appears in the above-identified patent and that said Letters Patent is hereby corrected as shown below:

In column 14, line 18, in Claim 14, after "schedule" delete "the".

Signed and Sealed this
Tenth Day of May, 2011

David J. Kappos
*Director of the United States Patent and Trademark Office*